United States Patent
Kim et al.

(10) Patent No.: US 11,128,015 B2
(45) Date of Patent: Sep. 21, 2021

(54) SECONDARY BATTERY

(71) Applicant: LG Chem, Ltd., Seoul (KR)

(72) Inventors: Kyung Min Kim, Daejeon (KR); Song Taek Oh, Daejeon (KR); Jung Seok Choi, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/637,127

(22) PCT Filed: Aug. 30, 2018

(86) PCT No.: PCT/KR2018/010097
§ 371 (c)(1),
(2) Date: Feb. 6, 2020

(87) PCT Pub. No.: WO2019/088434
PCT Pub. Date: May 9, 2019

(65) Prior Publication Data
US 2020/0168875 A1  May 28, 2020

(30) Foreign Application Priority Data

Nov. 1, 2017 (KR) .......................... 10-2017-0144685

(51) Int. Cl.
*H01M 2/16* (2006.01)
*H01M 50/46* (2021.01)
*H01M 10/44* (2006.01)

(52) U.S. Cl.
CPC ......... *H01M 50/46* (2021.01); *H01M 10/445* (2013.01)

(58) Field of Classification Search
CPC ......... H01M 10/0585; H01M 10/4214; H01M 10/445; H01M 2200/20; H01M 2220/30;
(Continued)

(56) References Cited

U.S. PATENT DOCUMENTS 6,183,900 B1    2/2001  Bronoel et al.
9,893,376 B2    2/2018  Yang et al.
(Continued)

FOREIGN PATENT DOCUMENTS

JP    2007053055 A    3/2007
JP    2008041606 A    2/2008
(Continued)

OTHER PUBLICATIONS

Machine Translation KR101472168B1 (Year: 2014).*
Extended European Search Report with Written Opinion for Application No. 18873745.6 dated Jul. 14, 2020, 8 pages.

*Primary Examiner* — Victoria H Lynch
(74) *Attorney, Agent, or Firm* — Lerner, David, Littenberg, Krumholz & Mentlik, LLP

(57) ABSTRACT

The present invention relates to a secondary battery. The secondary battery according to the present invention comprises an electrode assembly in which a positive electrode, a separator, and a negative electrode are alternately combined to be stacked; and a pouch that accommodates the electrode assembly therein. The separator comprises a first separator disposed between the positive electrode and the negative electrode and having a through-hole penetrated in a direction that faces the positive electrode and the negative electrode, and a second separator covering the through-hole of the first separator and having an end connected to the pouch. When an internal gas is generated due to overcharging, the pouch is expanded to allow the second separator to move to open the through-hole of the first separator to cause the positive electrode and the negative electrode to contact each other via the through-hole.

7 Claims, 4 Drawing Sheets

(58) Field of Classification Search
CPC .. H01M 50/116; H01M 50/449; H01M 50/46;
H01M 50/463; H01M 50/578
See application file for complete search history.

(56) References Cited

U.S. PATENT DOCUMENTS 9,972,868 B2    5/2018  Choi et al.
2017/0110712 A1 4/2017  Ahn et al.

FOREIGN PATENT DOCUMENTS

| JP | 2009227923 A | 10/2009 |
| JP | 2013243070 A | 12/2013 |
| KR | 20070105725 A | 10/2007 |
| KR | 20140015647 A | 2/2014 |
| KR | 101472168 B1 | 12/2014 |
| KR | 20150034600 A | 4/2015 |
| KR | 20170044941 A | 4/2017 |
| KR | 10-1746790 B1 | 6/2017 |

* cited by examiner

SECONDARY BATTERY

CROSS-REFERENCES TO RELATED APPLICATIONS

This application is a U.S. national phase application, pursuant to 35 U.S.C. 371, of PCT/KR2018/010097, filed Aug. 30, 2018, designating the United States, which claims priority to Korean Patent Application No. 10-2017-0144685, filed on Nov. 1, 2017. The entire contents of the aforementioned patent applications are incorporated herein by this reference.

TECHNICAL FIELD

The present invention relates to a secondary battery.

BACKGROUND ART

Rechargeable batteries are rechargeable unlike primarily batteries, and also have a great potential to be implemented in compact size and high capacity. Thus, recently, many studies on rechargeable batteries have been carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries based on a shape of a battery case. In such a secondary battery, an electrode assembly mounted in a battery case is a chargeable and dischargeable power generating device having a structure in which an electrode and a separator are stacked.

In addition, the electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound; a stacked type electrode assembly in which a plurality of positive and negative electrodes with a separator therebetween are sequentially stacked; and a stack/folding type electrode assembly in which stacked type unit cells are wound together with a separation film having a long length.

The secondary battery may have a risk of ignition and explosion due to overcharging, and thus, it is necessary to prevent the secondary battery from being overcharged.

DISCLOSURE OF THE INVENTION

Technical Problem

One aspect of the present invention is to provide a secondary battery that is capable of interrupting overcharging when the secondary battery is overcharged.

Technical Solution

A secondary battery comprises an electrode assembly in which a positive electrode, a separator, and a negative electrode are alternately combined to be stacked and a pouch that accommodates the electrode assembly therein, wherein the separator comprises a first separator disposed between the positive electrode and the negative electrode and having a through-hole penetrated in a direction that faces the positive electrode and the negative electrode, and a second separator covering the through-hole of the first separator and having an end connected to the pouch. When an internal gas is generated due to overcharging, the pouch is expanded to allow the second separator to move to open the through-hole of the first separator to cause the positive electrode and the negative electrode to contact each other via the through-hole.

Advantageous Effects

According to the present invention, the separator may be provided in the form in which the positive electrode and the negative electrode are short-circuited with each other when the pouch is swelled by the generation of the gas while the secondary battery is overcharged to interrupt the power supply due to the internal short circuit, thereby interrupting the overcharging.

MODE FOR CARRYING OUT THE INVENTION

Figure 1:
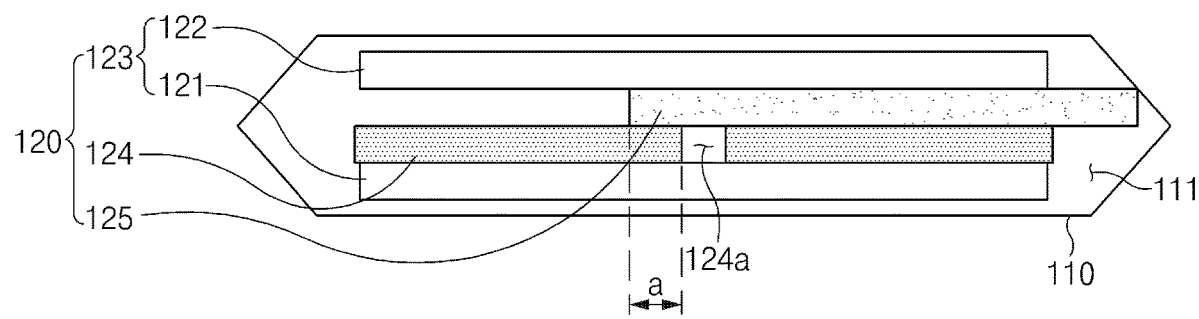
FIG. 1 is a conceptual cross-sectional view illustrating a state before a pouch is swelled in a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals when possible, even if they are illustrated in different drawings. In addition, the present invention may be embodied in different forms and should not be construed as limited to the embodiments set forth herein. In the following description of the present invention, the detailed descriptions of related arts which may unnecessarily obscure the gist of the present invention will be omitted.

FIG. 1 is a conceptual cross-sectional view illustrating a state before a pouch is swelled in a secondary battery according to an embodiment of the present invention.

Referring to FIG. 1, a secondary battery 100 according to an embodiment of the present invention comprises an electrode assembly 120 in which a positive electrode 121, separators 124 and 125, and a negative electrode 122 are alternately combined with each other; and a pouch 110 that accommodates the electrode assembly 120. In addition, the separators 124 and 125 comprise a first separator 124 and a second separator 125 disposed between the positive electrode 121 and the negative electrode 122.

Hereinafter, the secondary battery according to an embodiment of the present invention will be described in more detail with reference to FIGS. 1 and 2.

Referring to FIG. 1, the electrode assembly 120 may be a chargeable and dischargeable power generation element and may have a structure in which the electrodes 123 and the separators 124 and 125 are combined and alternately stacked with respect to each other.

The electrodes 123 may comprise a positive electrode 121 and a negative electrode 122. In particular, the electrode assembly 120 may have a structure in which the positive electrode 121/the separators 124 and 125/the negative electrode 122 are alternately stacked. Each of the separators 124 and 125 may be disposed between the positive electrode 121 and the negative electrode 122, and may be disposed outside the positive electrode 121 and outside the negative electrode 122.

The separators 124 and 125 are made of an insulation material to electrically insulate the positive electrode 121 from the negative electrode 122. For example, the separators 124 and 125 may be made of a polyolefin-based resin film such as polyethylene or polypropylene having micropores.

Figure 2:
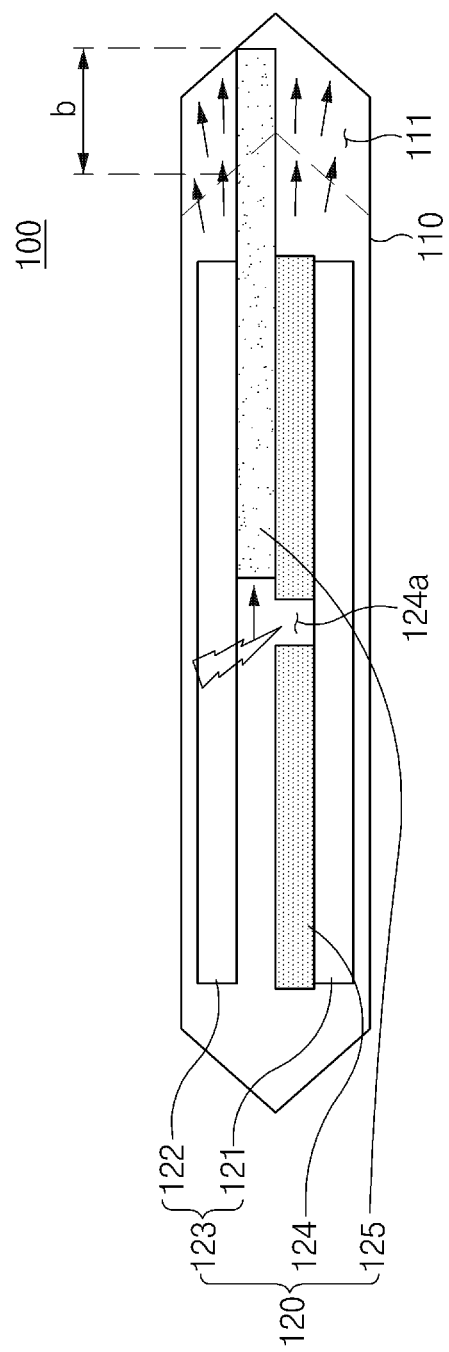
FIG. 2 is a conceptual cross-sectional view illustrating a state after the pouch is swelled in the secondary battery according to an embodiment of the present invention.

FIG. 2 is a conceptual cross-sectional view illustrating a state after the pouch is swelled in the secondary battery according to an embodiment of the present invention.

Referring to FIGS. 1 and 2, the separators 124 and 125 may comprise a first separator 124 and a second separator 125 disposed between the positive electrode 121 and the negative electrode 122.

The first separator 124 may have a through-hole 124a that is penetrated in a direction that faces the positive electrode 121 and the negative electrode 122.

The second separator 125 may cover the through-hole 124a of the first separator 124 and have an end connected to the pouch 110.

Further, the second separator 125 may have an end fixed to an inner surface of the pouch 110. Thus, when the pouch 110 is swelled due to generation of an internal gas, the second separator 125 may move in a lateral direction with respect to the direction in which the positive electrode 121, the separators 124 and 125, and the negative electrode 122 are stacked.

In particular, the first separator 124 may be bonded to be fixed to the positive electrode 121 or the negative electrode 122, which face each other, and the second separator 125 may be slidably provided without being boned to the positive electrode 121 or the negative electrode 122, which face each other.

One end of the second separator 125 may be fixed to a portion of the pouch 110, which is disposed in the lateral direction with respect to the direction in which the positive electrode 121, the separators 124 and 125, and the negative electrode 122 are stacked.

Further, a spaced distance a between the other end of the second separator 125 and the through-hole 124a of the first separator 124, which is measured in a normal state, may be less than an expansion width b of the pouch when the internal gas is generated. Thus, when the pouch is expanded, the through-hole 124a may be exposed.

Particularly, the spaced distance a may be less than an allowable expansion width of the pouch 110. Thus, safety of the battery may be ensured within an allowable range.

The first separator 124 may be stacked on one surface of the positive electrode 121, the second separator 125 may be stacked on one surface of the first separator 124, and the negative electrode 122 may be stacked on one surface of the second separator 125.

The pouch 110 may comprise an accommodation part 111 that accommodates the electrode assembly 120 and an electrolyte.

Furthermore, the pouch 110 may be made of, for example, a flexible material.

For example, the pouch may be constituted by a plurality of layers. In particular, an intermediate layer may be provided as an aluminum (Al) layer, and both surfaces thereof may be provided with a resin layer made of a synthetic resin.

For another example, the pouch 110 may be constituted by a plurality of layers in which a polypropylene (PP) layer, a nylon layer, an aluminum (Al) layer, and a polyethylene terephthalate (PET) layer are laminated in an order from the inside to the outside of the accommodation part 111.

In the above-described secondary battery 100 according to an embodiment of the present invention, when the pouch 110 is expanded by the internal gas generated due to the overcharging, the end of the second separator 125 may move in the expansion direction of the pouch 110 to allow the portion of the second separator 125, which covers the through-hole 124a of the first separator 124, to move to open the through-hole 124a. Thus, when the overcharging occurs, the through-hole 124a of the first separator 124 may be opened due to the expansion of the pouch 110 to allow the positive electrode 121 and the negative electrode 122, which are disposed on both sides of the first separator 124, to contact with each other via the through-hole 124a of the first separator 124, thereby causing a short circuit. Thus, the power supply may be interrupted by the internal short circuit to interrupt the overcharging. Since the short circuit is designed with the safety range of the pouch 110, the ignition due to the internal short circuit may be prevented.

Figure 3:
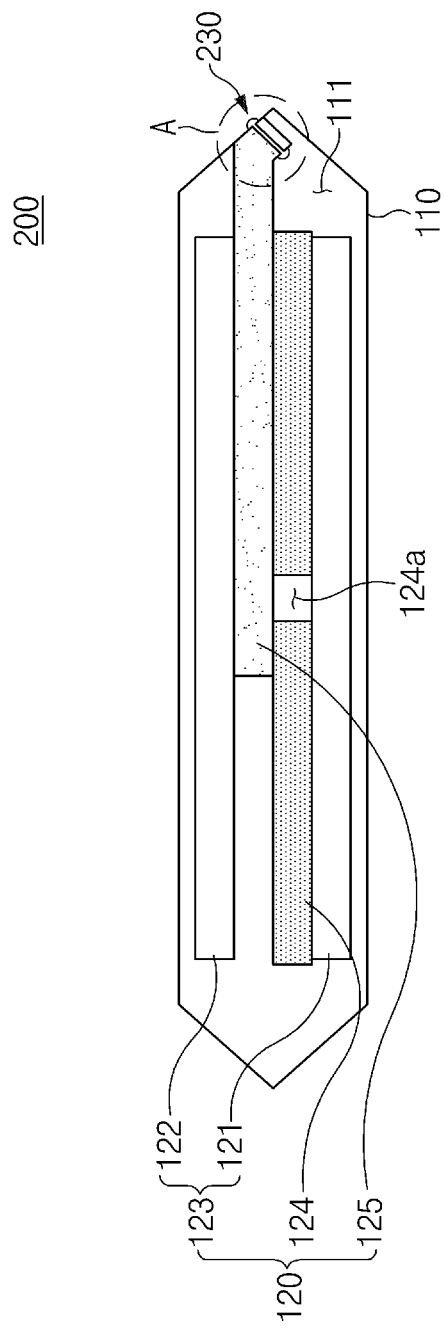
FIG. 3 is a conceptual cross-sectional view of a secondary battery according to another embodiment of the present invention.
Figure 4:
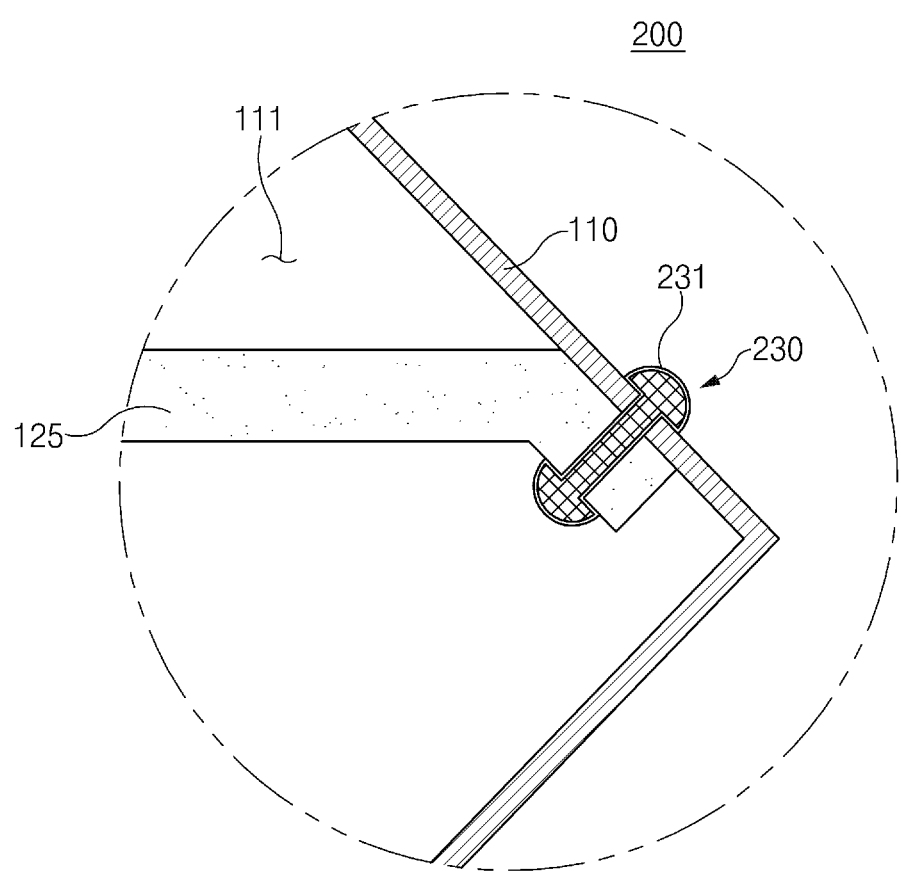
FIG. 4 is an enlarged cross-sectional view of a portion A of FIG. 3.

FIG. 3 is a conceptual cross-sectional view of a secondary battery according to another embodiment of the present invention, and FIG. 4 is an enlarged cross-sectional view of a portion A of FIG. 3.

Referring to FIGS. 3 and 4, a secondary battery 200 according to another embodiment of the present invention is different from the secondary battery 100 according to the foregoing embodiment in that a fixing unit 230 for fixing an end of a second separator 125 to a pouch 110 is provided. Thus, contents of this embodiment, which are duplicated with those according to the forgoing embodiment, will be briefly described, and also, differences therebetween will be mainly described.

The secondary battery 200 according to another embodiment of the present invention comprises an electrode assembly 120 in which a positive electrode 121, separators 124 and 125, and a negative electrode 122 are coupled and alternately stacked with respect to each other; and a pouch 110 that accommodates the electrode assembly 120. Further, the separators 124 and 125 comprise a first separator 124 and a second separator 125 disposed between the positive electrode 121 and the negative electrode 122. Furthermore, the fixing unit 230 for fixing the end of the second separator 125 to the pouch 110 may be further provided.

In more detail, the fixing unit 230 may fix the end of the second separator 125 to the pouch 110.

An insulation layer 231 may be applied to an outer surface of the fixing unit 230 to electrically insulate the pouch 110 from the fixing unit 230 when the end of the second separator 125 is fixed to the pouch 110 by the fixing unit 230.

For example, the fixing unit 230 may comprise a rivet.

Thus, in the secondary battery 200 according to another embodiment of the present invention, since the end of the second separator 125 is fixed to the pouch 110 by the fixing unit 230, when the pouch 110 is expanded due to overcharging, the end of the second separator 125 may easily move in an expansion direction of the pouch 110 while the end of the second separator 125 is prevented from separating from the pouch 110. Thus, when the pouch 110 is expanded, the end of the second separator 125 may move in the expansion direction of the pouch 110 to allow a portion of the second separator 125, which covers a through-hole 124a of the first separator 124, to move to easily open the through-hole 124a. As a result, when the overcharging occurs, the through-hole 124a of the first separator 124 may be opened due to the expansion of the pouch 110 to allow the positive electrode 121 and the negative electrode 122, which are disposed on both sides of the first separator 124, to contact with each other via the through-hole 124a of the first separator 124, thereby causing a short circuit and easily interrupting the overcharging.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   an electrode assembly in which a positive electrode, a separator, and a negative electrode are alternately combined and stacked; and
   a pouch that accommodates the electrode assembly therein,
   wherein the separator comprises:
   a first separator disposed between the positive electrode and the negative electrode and having a through-hole penetrated in a direction that faces the positive electrode and the negative electrode, the first separator being fixed to the positive or the negative electrode; and
   a second separator that covers the through-hole of the first separator and has an end connected to the pouch, the second separator being slidable relative to the first separator without being fixed to the positive electrode or the negative electrode,
   wherein, when an internal gas is generated due to overcharging, the pouch is expanded to allow the second separator to move to open the through-hole of the first separator to cause the positive electrode and the negative electrode to contact each other via the through-hole.

2. The secondary battery of claim 1, wherein the end of the second separator is fixed to an inner surface of the pouch, and
   wherein, when the pouch is expanded due to the generation of the internal gas, the second separator moves in a lateral direction with respect to a direction in which the positive electrode, the separator, and the negative electrode are stacked.

3. The secondary battery of claim 1, wherein the first separator is stacked on one surface of the positive electrode, the second separator is stacked on one surface of the first separator, and the negative electrode is stacked on one surface of the second separator.

4. The secondary battery of claim 1, wherein one end of the second separator is fixed to a portion of the pouch, which is disposed in a lateral direction with respect to a direction in which the positive electrode, the separator, and the negative electrode are stacked, and
   wherein a spaced distance between the other end of the second separator and the through-hole of the first separator, which is measured in a normal state, is less than an allowable expansion width of the pouch.

5. The secondary battery of claim 1, wherein the end of the second separator is fixed to the pouch by a fixing unit.

6. The secondary battery of claim 5, wherein the fixing unit comprises a rivet.

7. The secondary battery of claim 5, wherein an insulation layer is applied to an outer surface of the fixing unit.

* * * * *